US008126957B2

(12) United States Patent
Gowen et al.

(10) Patent No.: US 8,126,957 B2
(45) Date of Patent: *Feb. 28, 2012

(54) MANAGING POSITION INDEPENDENT CODE USING A SOFTWARE FRAMEWORK (75) Inventors: Michael Stan Gowen, Georgetown, TX (US); Barry L Minor, Austin, TX (US); Mark Richard Nutter, Austin, TX (US); John Kevin Patrick O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

This patent is subject to a terminal disclaimer.

(21) Appl. No.: 12/049,202

(22) Filed: Mar. 14, 2008

(65) Prior Publication Data
US 2008/0163155 A1   Jul. 3, 2008

Related U.S. Application Data (63) Continuation of application No. 10/988,288, filed on Nov. 12, 2004, now Pat. No. 7,512,699.

(51) Int. Cl.
*G06F 15/16* (2006.01)
(52) U.S. Cl. ......................... 709/202; 719/328
(58) Field of Classification Search .................. 709/201, 709/202, 220; 719/328
See application file for complete search history.

(56) References Cited

U.S. PATENT DOCUMENTS

| 5,781,226 A | 7/1998 | Sheehan ........................ 725/134 |
| 5,838,906 A | 11/1998 | Doyle et al. .................. 709/202 |
| 6,526,491 B2 | 2/2003 | Suzuoki et al. ............... 711/164 |
| 6,559,854 B2 | 5/2003 | Oka et al. ..................... 345/619 |
| 6,571,388 B1 | 5/2003 | Venkatraman et al. ....... 717/166 |
| 2001/0002130 A1 | 5/2001 | Suzuoki ........................ 345/420 |
| 2002/0046229 A1 | 4/2002 | Yutaka et al. ................. 709/102 |
| 2002/0060690 A1 | 5/2002 | Tanaka et al. ................. 345/619 |
| 2002/0095523 A1 | 7/2002 | Shimakawa et al. ......... 709/316 |
| 2002/0135582 A1 | 9/2002 | Suzuoki et al. .............. 345/502 |
| 2002/0138637 A1 | 9/2002 | Suzuoki et al. .............. 709/230 |
| 2002/0138701 A1 | 9/2002 | Suzuoki et al. .............. 711/154 |
| 2002/0138707 A1 | 9/2002 | Suzuoki et al. .............. 711/163 |
| 2002/0156993 A1 | 10/2002 | Suzuoki et al. ................. 712/30 |
| 2003/0055984 A1 | 3/2003 | Shimakawa et al. ......... 709/316 |
| 2003/0110312 A1* | 6/2003 | Gunduc et al. ............... 709/328 |

FOREIGN PATENT DOCUMENTS

EP    0 911 728 A1    4/1999

OTHER PUBLICATIONS

Andrew S. Tanenbaum: "Modern Operating Systems," Second Edition. 2001. pp. 61, 202-210, 218-222.

* cited by examiner

*Primary Examiner* — David Lazaro
(74) *Attorney, Agent, or Firm* — VanLeeuwen & VanLeeuwen; Matthew B Talpis (57) ABSTRACT An approach for managing position independent code using a software framework is presented. A software framework provides the ability to cache multiple plug-in's which are loaded in a processor's local storage. A processor receives a command or data stream from another processor, which includes information corresponding to a particular plug-in. The processor uses the plug-in identifier to load the plug-in from shared memory into local memory before it is required in order to minimize latency. When the data stream requests the processor to use the plug-in, the processor retrieves a location offset corresponding to the plug-in and applies the plug-in to the data stream. A plug-in manager manages an entry point table that identifies memory locations corresponding to each plug-in and, therefore, plug-ins may be placed anywhere in a processor's local memory.

15 Claims, 8 Drawing Sheets

| ENTRY POINT TABLE | | | |
|---|---|---|---|
| Plug-In ID | Usage Frequency | Address Location Offset | Size |
| X | 12 | 0F43213 | 10KB |
| Y | 432 | 2F43547 | 3KB |
| ⋮ | ⋮ | ⋮ | 24KB |
| M | 1 | 7D43407 | 60KB |

MANAGING POSITION INDEPENDENT CODE USING A SOFTWARE FRAMEWORK

RELATED APPLICATIONS

This application is a continuation application of U.S. Non-Provisional patent application Ser. No. 10/988,288, entitled "System and Method for Managing Position Independent Code Using a Software Framework," filed on Nov. 12, 2004 now U.S. Pat. No. 7,512,699.

BACKGROUND OF THE INVENTION

1. Technical Field

The present invention relates in general to a system and method for managing position independent code using a software framework. More particularly, the present invention relates to a system and method for loading position independent plug-ins into a processor's local memory in time for use with upcoming data in order to hide memory latency.

2. Description of the Related Art

Computer systems are becoming more and more complex. The computer industry typically doubles the performance of a computer system every 18 months (e.g. personal computer, PDA, gaming console). In order for the computer industry to accomplish this task, the semiconductor industry produces integrated circuits that double in performance every 18 months. A computer system uses integrated circuits for particular functions based upon the integrated circuits' architecture. Two fundamental architectures are 1) microprocessor-based and 2) digital signal processor-based.

An integrated circuit with a microprocessor-based architecture is typically used to handle control operations whereas an integrated circuit with a digital signal processor-based architecture is typically designed to handle signal-processing manipulations (i.e. mathematical operations). As technology evolves, the computer industry and the semiconductor industry realize the importance of using both architectures, or processor types, in a computer system design.

The computer industry is moving towards a multi-processor architecture that typically includes a main processor and one or more support processors. The main processor typically executes a main operating system, and invokes application programs. In turn, the application programs use the support processors for offloading highly computational tasks, whereby the support processors typically retrieve plug-ins in order to perform the task.

A challenge found when a processor loads a program is that addresses are required to change within the program that call plug-ins in order to ensure that pointers have a correct offset to access the plug-ins. Changing plug-in addresses require more processing time, and when multiple programs access a particular plug-in, each program may have a different address that corresponds to the plug-in.

In addition, another challenge found is that latency results when a processor loads a plug-in from main memory and applies the plug-in to data. The data sits in the processor's memory while the processor retrieves the plug-in from main memory, wasting valuable processing time.

What is needed, therefore, is a system and method for eliminating program address changing steps and minimizing plug-in loading latency in order to increase a computer system's throughput performance.

SUMMARY

It has been discovered that the aforementioned challenges are resolved by using position independent plug-ins in a software framework and loading the position independent plug-ins into a processor's local memory prior to the processor requiring the plug-ins. The processor receives a data stream from another processor, which includes information corresponding to one or more particular plug-ins. The processor uses plug-in identifiers to load plug-ins from main memory into the processor's local memory before the processor requires the plug-ins. The processor manages an entry point table that identifies memory locations corresponding to each plug-in and, therefore, the plug-in's are position independent in that they may be placed anywhere in the processor's local memory. When the data stream requests the processor to use the plug-in, the processor applies the plug-in to the data stream and manipulates the data.

A first processor sends a data stream that includes one or more plug-in identifiers to a second processor. The data stream includes a plug-in identifier that corresponds to existing data that is included in the existing data stream and may include a plug-in identifier that corresponds to data in an upcoming data stream. The second processor extracts the plug-in identifier that corresponds to the existing data, accesses a plug-in entry that is located in an entry point table, and determines a local memory location of the corresponding position independent plug-in. The processor uses the determined location to apply the plug-in to the existing data. In addition, the processor logs the plug-in's usage in the entry point table in order to track the plug-in's utilization.

The second processor also checks whether an impending plug-in identifier is included in the data stream. If an impending plug-in identifier is included in the data stream, the second processor uses the entry point table to identify whether its corresponding plug-in is already loaded in the second processor's local memory. If the corresponding plug-in is not loaded in local memory, the second processor retrieves the plug-in from main memory and loads the plug-in into local memory. In doing so, the processor logs the local memory address location of the plug-in in the entry point table such that the processor is able to locate the plug-in when required.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a flowchart showing steps taken in executing a position independent plug-in;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
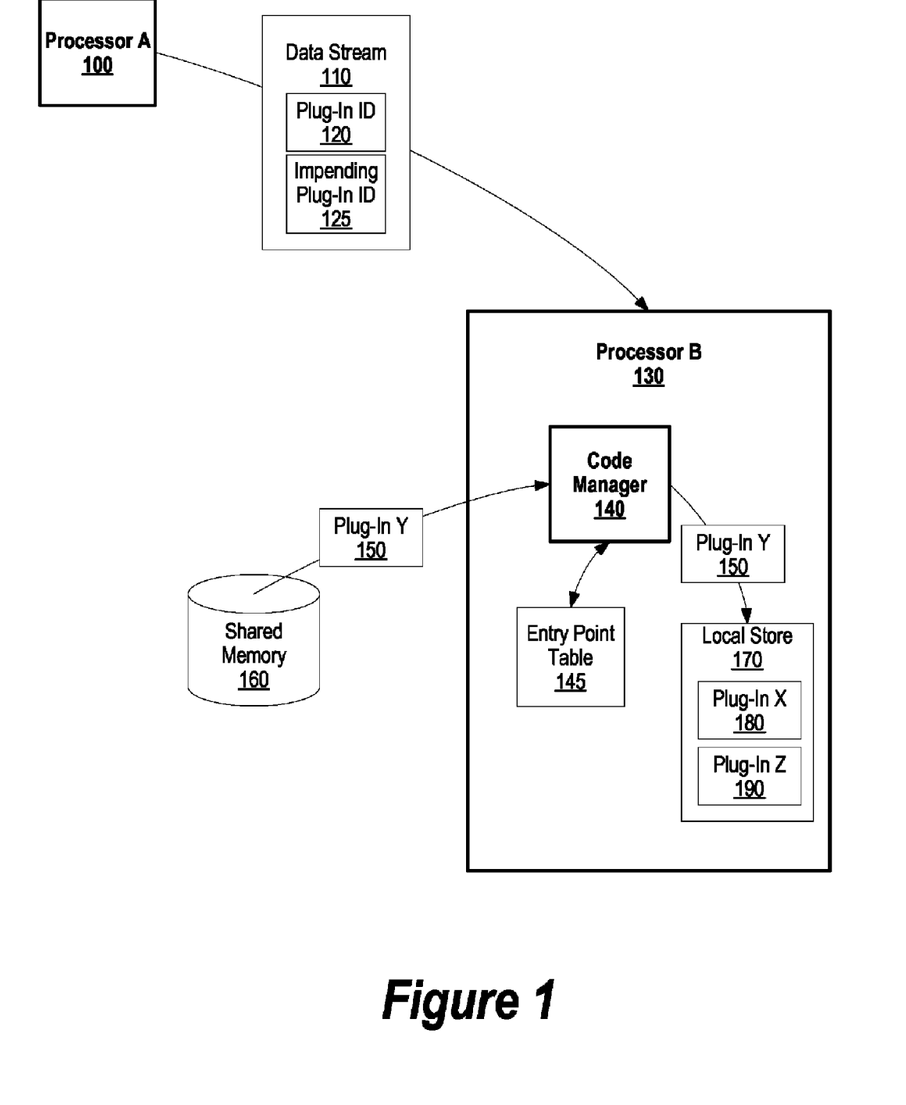
FIG. 1 is a diagram showing a first processor sending a data stream that includes one or more plug-in identifiers to a second processor.

FIG. 1 is a diagram showing a first processor sending a data stream that includes one or more plug-in identifiers to a second processor. The data stream uses a plug-in identifier to determine which plug-in to apply to data that is included in the data stream. In addition, the data stream may include an impending plug-in identifier that corresponds to upcoming data that the first processor sends to the second processor. The second processor uses the impending plug-in identifier to determine whether it has a corresponding plug-in loaded in its local memory. If not, the second processor retrieves the corresponding plug-in from shared memory and loads the plug-in into local memory. When the second processor receives the upcoming data, the second processor is ready to access the plug-in from its local memory, thus hiding memory latency.

Processor A 100 sends data stream 110 to processor B 130. Data stream 110 includes particular fields, which include plug-in identifier 120 and may include impending plug-in identifier 125 (see FIG. 2A and corresponding text for further details regarding data stream fields).

Processor B 130 includes code manager 140 and entry point table 145. Code manager 140 manages position-independent plug-ins that are stored in local store 170, and uses entry point table 145 to track the location of the plug-ins. Code manager 140 extracts plug-in identifier 120 from data stream 110, and accesses a plug-in entry that is located in entry point table in order to determine the location of a corresponding position-independent plug-in in local store 170, such as plug-in X 180 and plug-in Z 190 (see FIG. 6 and corresponding text for further details regarding entry point table properties). Local store 170 may be stored on a nonvolatile storage area, such as a computer hard drive. Code manager 140 identifies the corresponding plug-in's location, and uses the location to apply the plug-in to data that is included in data stream 110. In addition, code manager 140 logs the plug-in's usage in entry point table 145 in order to track the plug-in's utilization (see FIG. 4 and corresponding text for further details regarding plug-in logging).

Code manager 140 checks whether impending plug-in 125 is included in data stream 110. If impending plug-in 125 is included in data stream 110, code manager 140 extracts impending plug-in identifier 125, and uses entry point table 145 to identify whether a corresponding plug-in is already loaded in local store 170. In FIG. 1, impending plug-in identifier 125 corresponds to plug-in Y 150, and since plug-in Y 150 is not loaded into local store 170, code manager 140 retrieves plug-in Y 150 from shared memory 160 and stores it in local store 170. Shared memory 160 may be stored on a nonvolatile storage area, such as a computer hard drive. In addition, code manager 140 creates a log entry in entry point table 140 that includes the location at which plug-in Y 150 is stored. In turn, processor B 130 is ready to apply plug-in Y 150 to data that it receives.

Figure 2A:
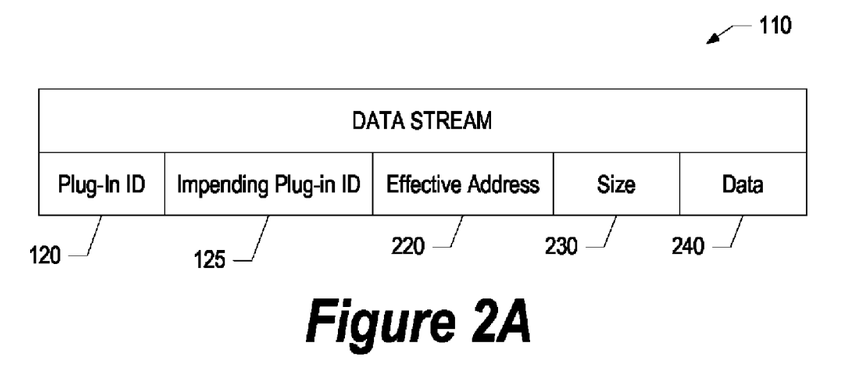
FIG. 2A is a diagram showing data stream attributes.

FIG. 2A is a diagram showing data stream attributes. A first processor sends a data stream, such as data stream 110, to a second processor whereby data stream 110 includes information for the second processor to invoke a plug-in on data that is included in the data stream. Data stream 110 is the same as that shown in FIG. 1.

Data stream 110 includes fields 120, 125, 220, 230, and 240. Field 120 includes plug-in identifier 120 that informs the second processor as to which plug-in to invoke using data 240. Plug-in identifier 120 is the same as that shown in FIG. 1. Field 125 includes an impending plug-in identifier that informs the second processor that upcoming data will use a particular plug-in. The processor uses impending plug-in identifier 125 to determine whether the processor already has a corresponding plug-in in its local memory. If the processor does not have the plug-in loaded in its local memory, the processor retrieves the plug-in from shared memory and loads it in its local memory. Impending plug-in identifier 125 is the same as that shown in FIG. 1.

Field 220 includes an effective address that corresponds to a plug-in identifier and includes the location in shared memory as to the plug-in's location. Field 230 includes the size of the particular plug-in. The processor stores the size of the plug-in in a corresponding plug-in entry that is located in an entry point table (see FIG. 6 and corresponding text for further details regarding plug-in entry properties).

Figure 2B:
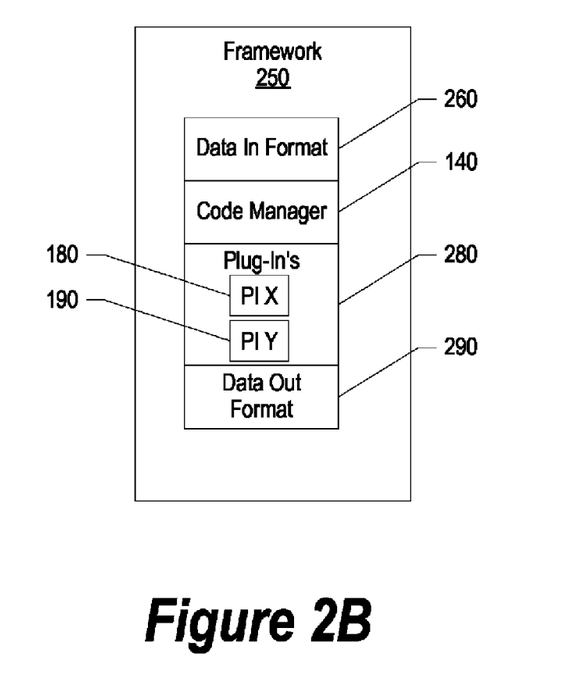
FIG. 2B is a diagram showing a plug-in management framework.

FIG. 2B is a diagram showing a plug-in management framework. Particular framework sections are combined in order to create framework 250. Framework 250 includes data in format 260, which defines a format and attributes that a particular processor receives. Code manager 140 manages the plug-in retrieval, storage, and invocation of the plug-ins. Code manager 140 is the same as that shown in FIG. 1.

Framework 250 includes plug-ins 280 which include plug-ins that are loaded into a processor's local memory. The example shown in FIG. 2B shows that plug-ins 280 includes plug-in X 180 and plug-in Y 190, which are the same as that shown in FIG. 1. Framework 250 also includes data out format 290, which defines the format and attributes that data that a processor outputs after a plug-in execution. Each of these framework sections may be changed or configured based upon a computer system's particular requirement.

Figure 3:
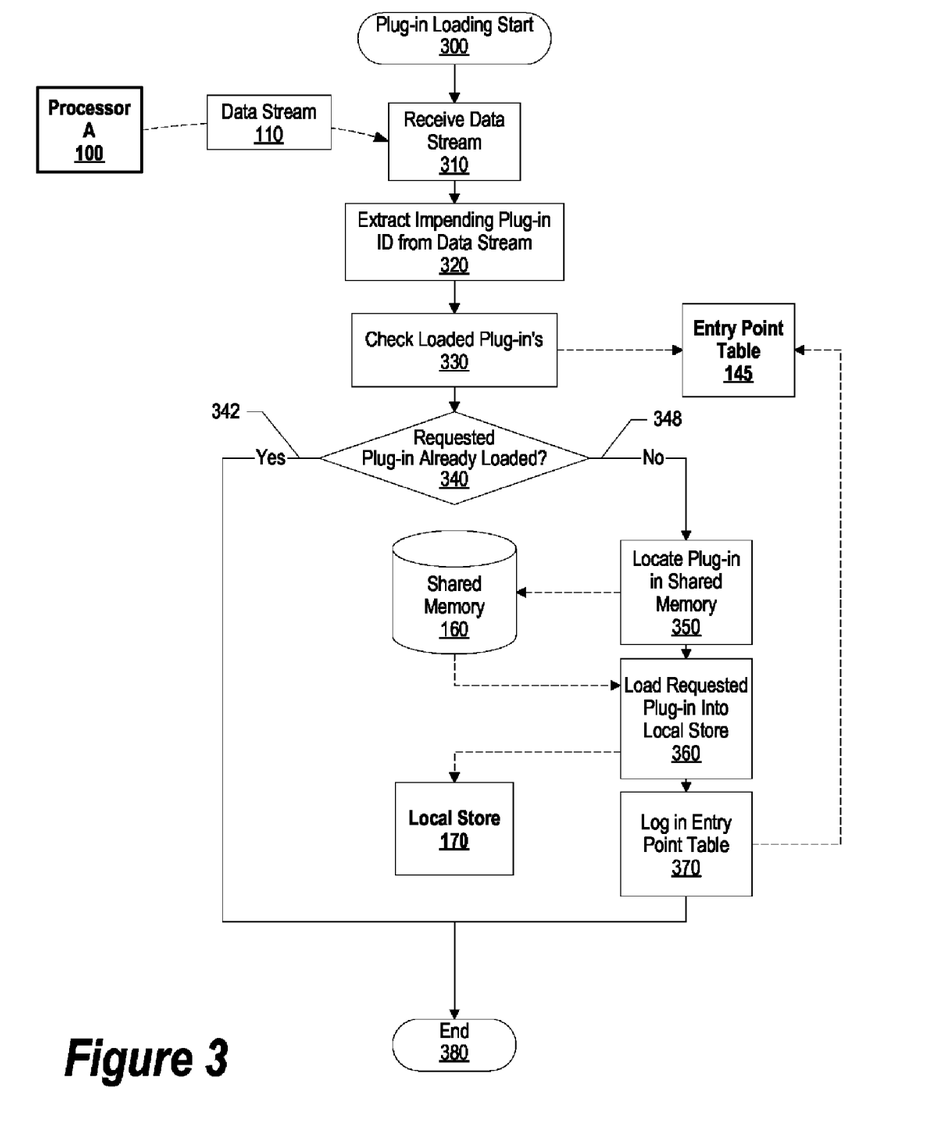
FIG. 3 is a flowchart showing steps taken in receiving a data stream and loading a position-independent plug-in into local memory.

FIG. 3 is a flowchart showing steps taken in receiving a data stream and loading a position-independent plug-in into local memory. Processing commences at 300, whereupon processor B receives data stream 110 from processor A 100. Data stream 110 includes an impending plug-in identifier that corresponds to a plug-in that is used with subsequent data (see FIG. 2A and corresponding text for further details regarding data stream fields. Processor A 100 and data stream 110 are the same as that shown in FIG. 1.

At step 320, processing extracts the impending plug-in identifier from data stream 110. Processing checks in entry point table 145 to detect whether a plug-in that corresponds to the impending plug-in identifier is already loaded in processor B's local store 170. The entry point table includes a list of loaded plug-ins, their corresponding address location in local store 170, and may include other attributes, such as plug-in size (see FIG. 6 and corresponding text for further details regarding entry point table attributes). Entry point table 145 and local store 170 are the same as that shown in FIG. 1.

A determination is made as to whether the plug-in corresponding to the impending plug-in identifier is loaded in local store 170 (decision 340). If the requested plug-in is already loaded in processor B's local memory, decision 340 branches to "Yes" branch 342 whereupon processing bypasses plug-in loading steps. On the other hand, if the plug-in is not loaded in processor B's local memory, decision 340 branches to "No" branch 348 whereupon processing locates the plug-in in shared memory 160 (step 350). Shared memory is the same as that shown in FIG. 1 and is memory that is shared between processor B and processor A 100. Processing retrieves the plug-in from shared memory 160, and stores the plug-in in local store 170. Since the plug-in is position-independent, processing logs the address location in local store 170 of the plug-in in entry point table 145 (step 370) such that when the plug-in is used, processor B uses the address location as an offset in order to execute the plug-in (see FIG. 4 and corresponding text for further details regarding plug-in execution). Plug-in loading processing ends at 380.

Figure 4:
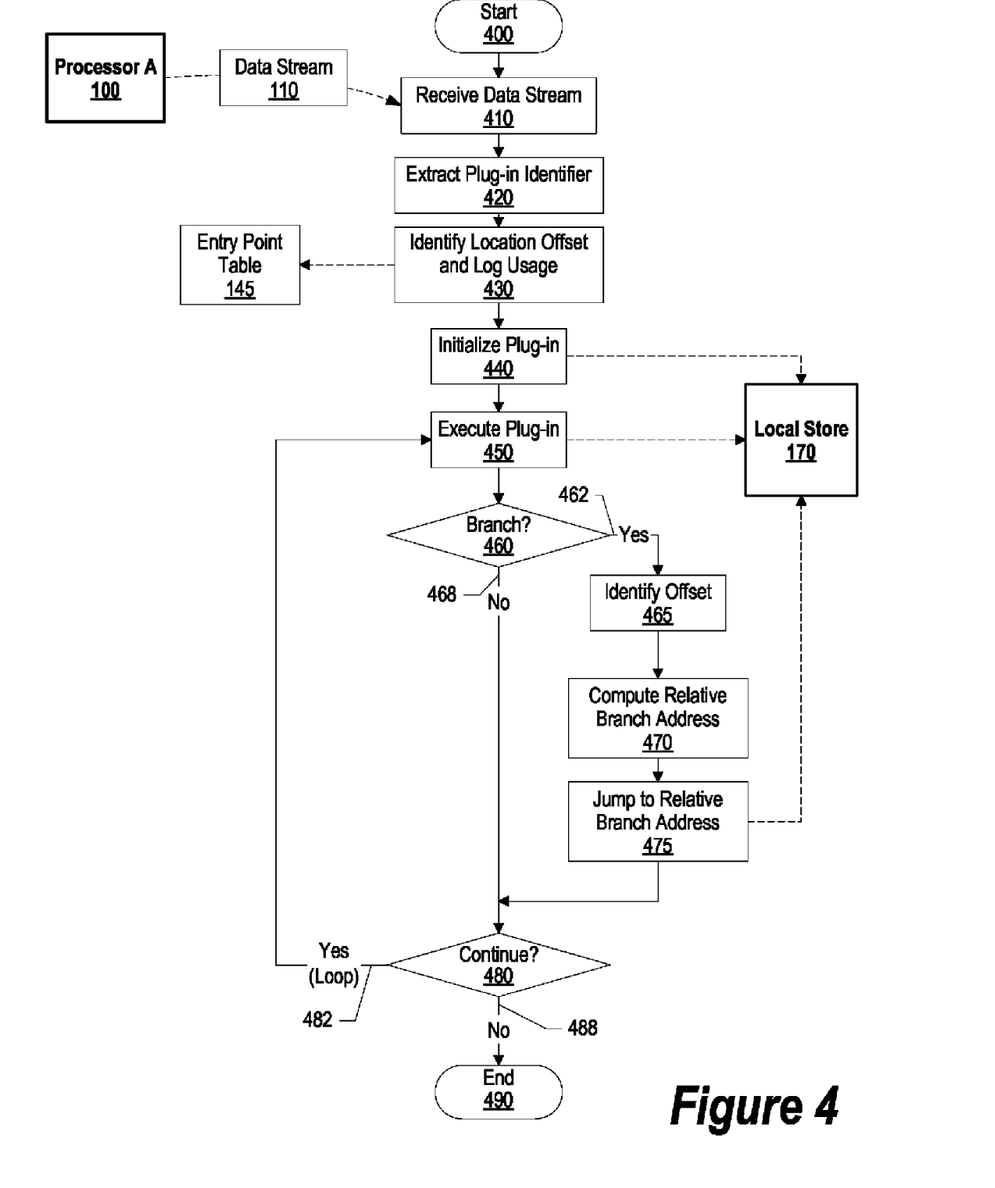

FIG. 4 is a flowchart showing steps taken in executing a position independent plug-in. Processing commences at 400, whereupon processing receives data stream 110 from processor A 100. Data stream 110 includes a plug-in identifier that corresponds to the data that is included in data stream 110 (see FIG. 2A and corresponding text for further details regarding data stream attributes. Processor A 100 and data stream 110 are the same as that shown in FIG. 1.

Processing extracts the plug-in identifier from data stream 110 at step 420, and identifies a corresponding plug-in using a location offset that is included in entry point table 145 (step 430). Entry point table 145 includes a list of plug-ins that are loaded in processor B's local memory, whereby each plug-in entry includes the plug-in's address location (see FIG. 6 and corresponding text for further details regarding entry point table properties). Entry point table 145 is the same as that shown in FIG. 1.

Processing uses the retrieved plug-in address to initialize (step 440) and execute (step 450) the plug-in that is located in local store 170. Local store 170 is processor B's local memory and is the same as that shown in FIG. 1. While the plug-in is executing, a determination is made as to whether the plug-in encounters a branch condition (decision 460). Since the plug-in is relocatable, branches are offsets of the starting location of the plug-in, and are not absolute addresses. Therefore, processing is able to branch within a position-independent plug-in regardless of the address location of the plug-in.

If the plug-in does not encounter a branch instruction, decision 460 branches to "No" branch 468 bypassing code branching steps. On the other hand, if processing encounters a branch instruction, decision 460 branches to "Yes" branch 462 whereupon processing identifies an offset that is associated with the branch instruction (step 465). At step 470, processing computes a relative branch address using the identified branch offset and, at step 475, processing branches to the relative branch address to continue processing.

A determination is made as to whether the plug-in is finished processing (decision 480). If the plug-in is not finished processing, decision 480 branches to "Yes" branch 482 whereupon processing loops back to continue executing the plug-in. This looping continues until the plug-in is finished executing, at which point decision 480 branches to "No" branch 488 whereupon processing ends at 490.

Figure 5:
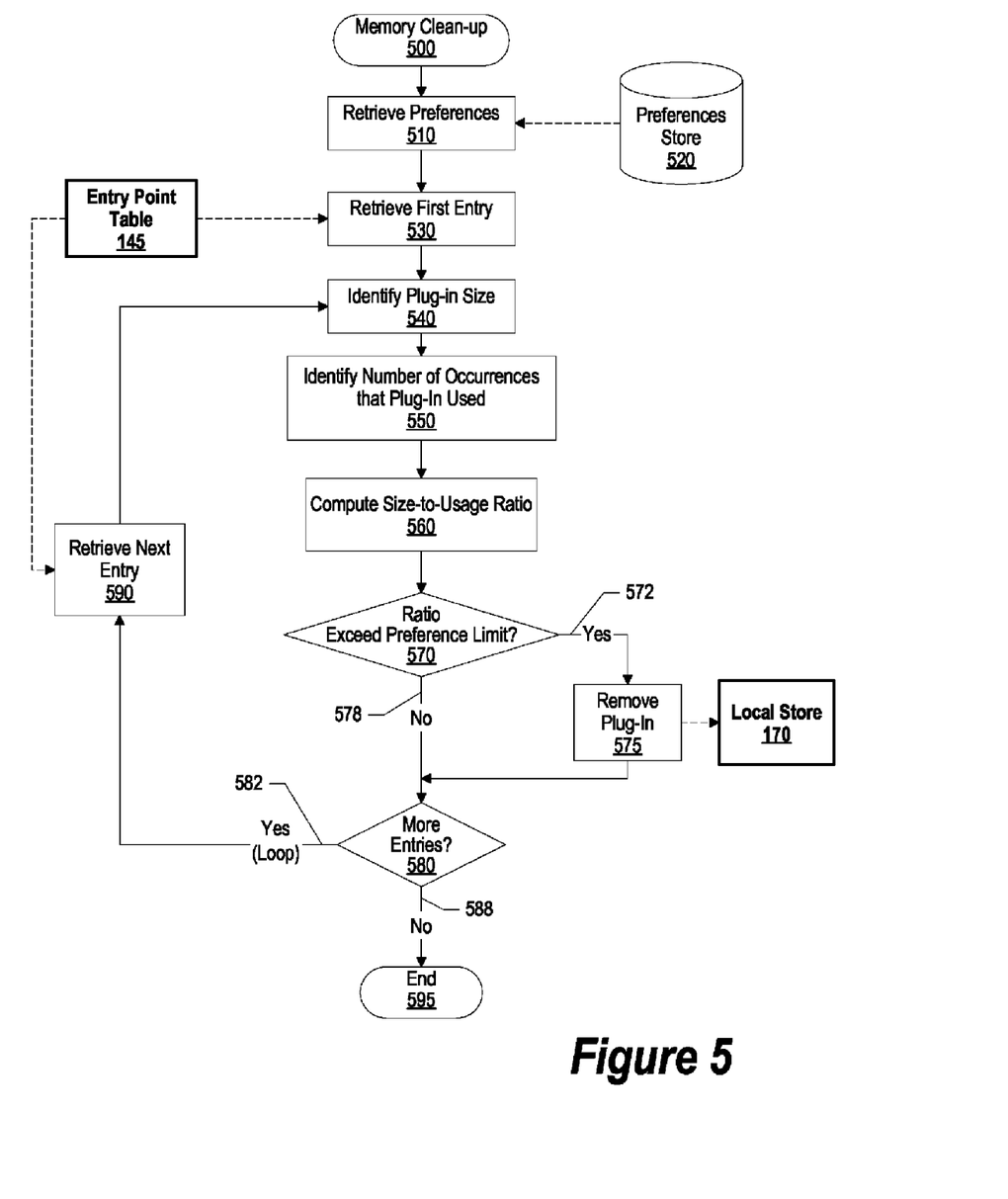
FIG. 5 is a flowchart showing steps taken in cleaning up a processor's local memory.

FIG. 5 is a flowchart showing steps taken in cleaning up a processor's local memory. During code execution, a processor loads multiple plug-ins into its local memory. At times, the processor may wish to remove some of the plug-ins from local memory that are not often utilized. One embodiment to remove plug-ins may be based upon the size of the plug-in and the number of instances that the plug-in is utilized. For example, a processor may wish to remove a large plug-in that is not often utilized from its local memory.

Memory clean-up processing commences at 500, whereupon processing retrieves preferences from preferences store 520. The preferences may include a "size-to-usage" ratio that a user defines whereby the user wishes to remove plug-ins that are large compared to the amount of instances that they are utilized. Preferences store 520 may be stored on a nonvolatile storage area, such as a computer hard drive.

Processing retrieves a first plug-in entry from entry point table 145 at step 530. Each plug-in entry may include attributes such as a plug-in identifier, a local storage address, the plug-in's size, and usage information (see FIG. 6 and corresponding text for further details regarding plug-in entries). Processing identifies the retrieved entry's plug-in size (step 540) and its usage frequency (step 550). For example, the plug-in size may be 100 KB and its usage frequency may be "two."

At step 560, processing computes a size-to-usage ration using the identified plug-in size and the usage frequency. Using the example described above, the size-to-usage ratio would be as follows:

$$\text{Size-to-Usage Ratio} = 100K/2 = 50K$$

A determination is made as to whether the computed size-to-usage ration exceeds the retrieved preference limit (decision 570). For example, a user may specify that a processor should remove plug-ins that have a size-to-usage ratio that is larger than 30K. If the computed size-to-usage ration is larger than the preference limit, decision 570 branches to "Yes" branch 572 whereupon processing removes the plug-in from local store 170 (step 575). Using the example described above, since the computed size-to-usage ratio (50K) is larger than the preference limit (30K), processing removes the plug-in. Local store 170 is the same as that shown in FIG. 1. On the other hand, if the computed size-to-usage ratio is not larger than the preference limit, decision 570 branches to "No" branch 578 bypassing plug-in removal steps.

A determination is made as to whether there are more plug-in entries included in entry point table 145 (decision 580). If there are more plug-in entries included in entry point table 145, decision 580 branches to "Yes" branch 582 whereupon processing retrieves (step 590) and processes the next plug-in entry. This looping continues until there are no more plug-in entries to process, at which point decision 580 branches to "No" branch 588 whereupon processing ends at 595.

Figure 6:
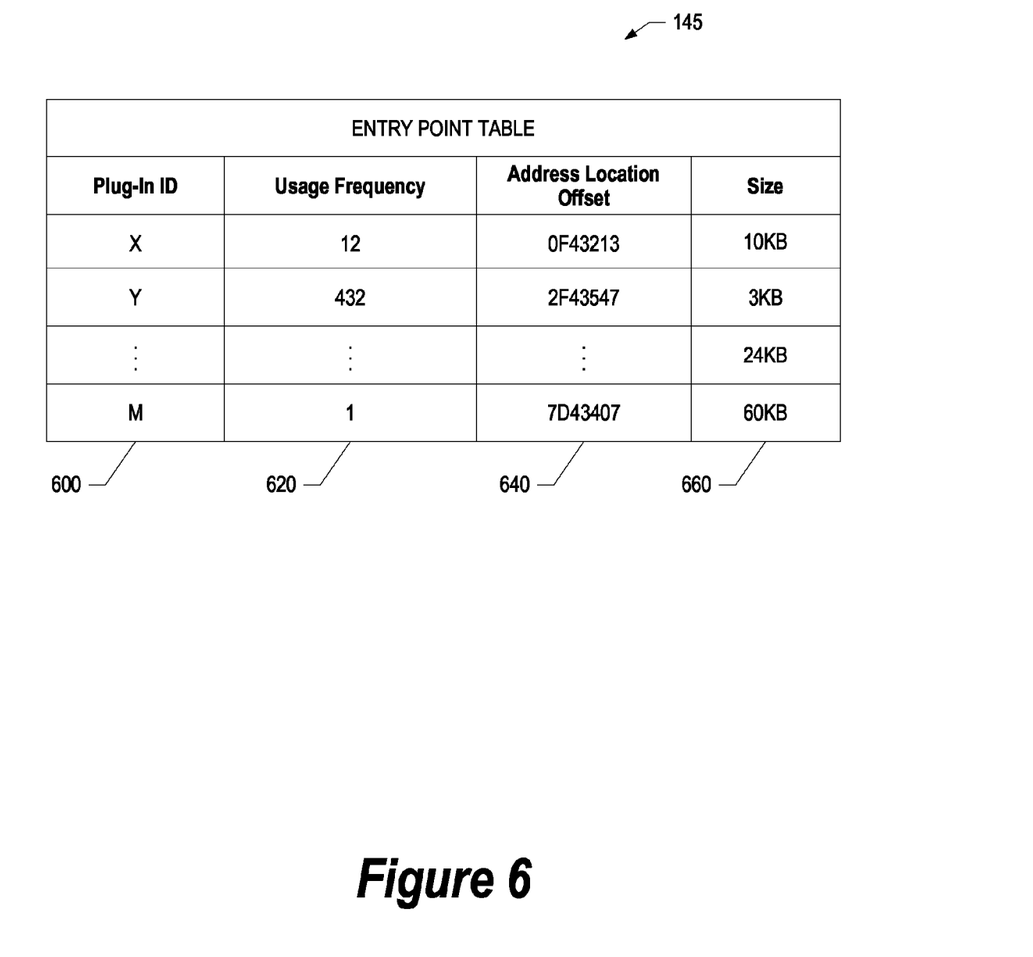
FIG. 6 is a diagram showing an entry point table.

FIG. 6 is a diagram showing plug-in entries that are included in an entry point table. When a processor retrieves a plug-in from shared memory and stores the plug-in in local memory, the processor adds a plug-in entry into entry point table 145. The processor uses entry point table 145 to track the location of the plug-ins in its memory, as well as track particular properties of the plug-in, such as its size and the number of times that the plug-in is utilized. Entry point table 145 is the same as that shown in FIG. 1 and may be stored on a nonvolatile storage area, such as a computer hard drive.

Entry point table 145 includes columns 600 through 660, whereby each column includes a particular attributes that corresponds to the plug-in entries. Column 600 includes a list of plug-in identifiers that correspond to plug-ins that are currently loaded in a processor's local memory. Column 620 includes a list of "usage frequencies" that correspond to each plug in. The usage frequency tracks the number of times that a plug-in is utilized while the plug-in is stored in the processor's local memory. The usage frequency may be used to determine whether to remove a plug-in from memory during a memory clean-up process. For example, if plug-in is 100 KB and is utilized only once, the processor may decide to remove the plug-in from its shared memory because it is fairly large relative to the number of times that the plug-in is utilized (see FIG. 5 and corresponding text for further details regarding memory clean-up).

Column 640 includes a list of local address location offsets that correspond to the starting address of the loaded plug-ins in the processor's local memory. The processor uses address location offsets to locate the plug-in when the plug-in is called. Column 660 includes a list of the size of each plug-in that is stored in the processor's local memory. A processor may take into account a plug-in's size when the processor is cleaning-up its internal memory and removing large, infrequently utilized plug-ins.

Figure 7:
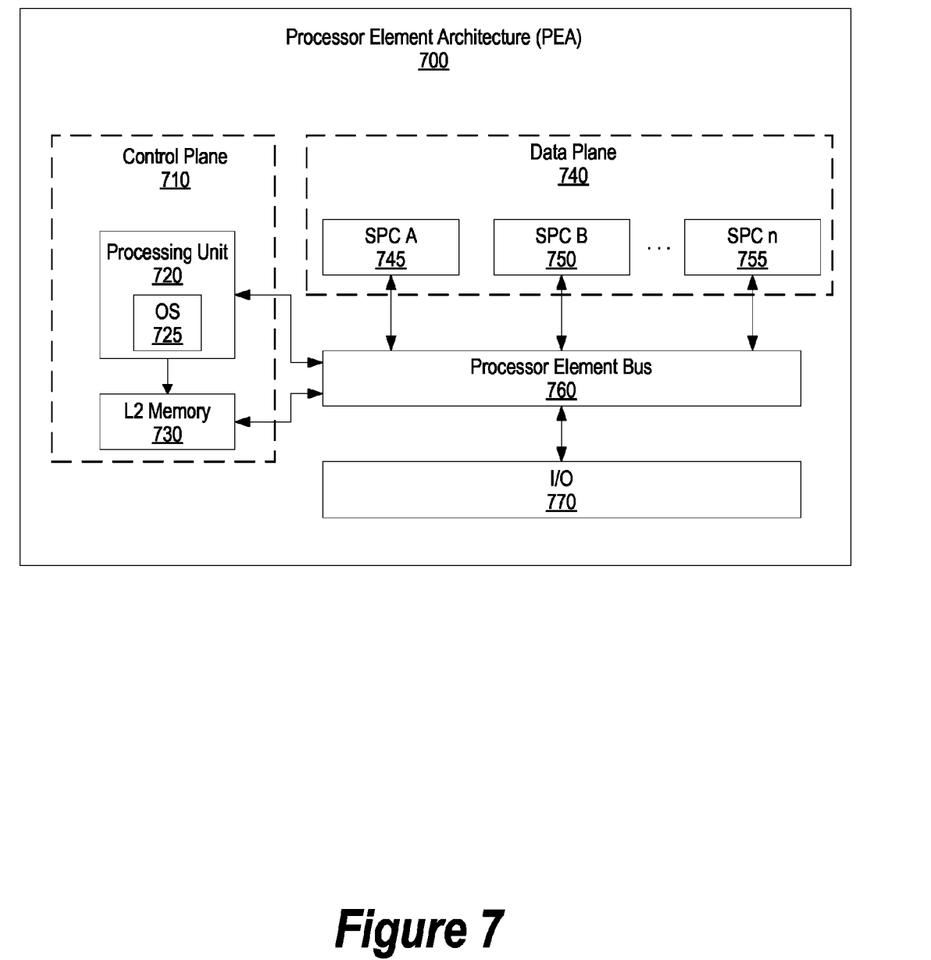
FIG. 7 is a diagram showing a processor element architecture that includes a plurality of heterogeneous processors.

FIG. 7 is a diagram showing a processor element architecture that includes a plurality of heterogeneous processors. The heterogeneous processors share a common memory and a common bus. Processor element architecture (PEA) 700 sends and receives information to/from external devices through input output 770, and distributes the information to control plane 710 and data plane 740 using processor element bus 760. Control plane 710 manages PEA 700 and distributes work to data plane 740.

Control plane 710 includes processing unit 720 which runs operating system (OS) 725. For example, processing unit 720 may be a Power PC core that is embedded in PEA 700 and OS 725 may be a Linux operating system. Processing unit 720 manages a common memory map table for PEA 700. The memory map table corresponds to memory locations included in PEA 700, such as L2 memory 730 as well as non-private memory included in data plane 740 (see FIG. 8A, 8B, and corresponding text for further details regarding memory mapping).

Data plane 740 includes Synergistic Processing Complex's (SPC) 745, 750, and 755. Each SPC is used to process data information and each SPC may have different instruction sets. For example, PEA 700 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 745, 750, and 755 are connected to processor element bus 760 which passes information between control plane 710, data plane 740, and input/output 770. Bus 760 is an on-chip coherent multi-processor bus that passes information between I/O 770, control plane 710, and data plane 740. Input/output 770 includes flexible input-output logic which dynamically assigns interface pins to input output controllers based upon peripheral devices that are connected to PEA 700. For example, PEA 700 may be connected to two peripheral devices, such as peripheral A and peripheral B, whereby each peripheral connects to a particular number of input and output pins on PEA 700. In this example, the flexible input-output logic is configured to route PEA 700's external input and output pins that are connected to peripheral A to a first input output controller (i.e. IOC A) and route PEA 700's external input and output pins that are connected to peripheral B to a second input output controller (i.e. IOC B).

Figure 8A:
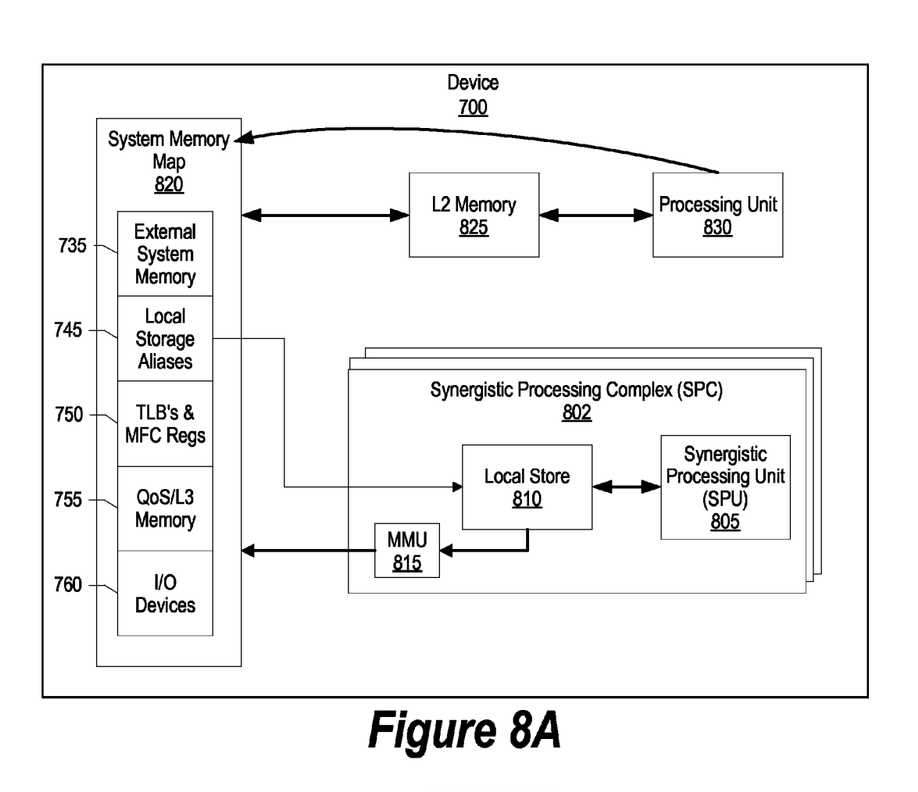
FIG. 8A illustrates an information handling system which is a simplified example of a computer system capable of performing the computing operations described herein.

FIG. 8A illustrates an information handling system which is a simplified example of a computer system capable of performing the computing operations described herein. The example in FIG. 8A shows a plurality of heterogeneous processors using a common memory map in order to share memory between the heterogeneous processors. Device 800 includes processing unit 830 which executes an operating system for device 800. Processing unit 830 is similar to processing unit 720 shown in FIG. 7. Processing unit 830 uses system memory map 820 to allocate memory space throughout device 800. For example, processing unit 830 uses system memory map 820 to identify and allocate memory areas when processing unit 830 receives a memory request. Processing unit 830 accesses L2 memory 825 for retrieving application and data information. L2 memory 825 is similar to L2 memory 730 shown in FIG. 7.

System memory map 820 separates memory mapping areas into regions which are regions 835, 845, 850, 855, and 860. Region 835 is a mapping region for external system memory which may be controlled by a separate input output device. Region 845 is a mapping region for non-private storage locations corresponding to one or more synergistic processing complexes, such as SPC 802. SPC 802 is similar to the SPC's shown in FIG. 7, such as SPC A 745. SPC 802 includes local memory, such as local store 810, whereby portions of the local memory may be allocated to the overall system memory for other processors to access. For example, 1 MB of local store 810 may be allocated to non-private storage whereby it becomes accessible by other heterogeneous processors. In this example, local storage aliases 845 manages the 1 MB of nonprivate storage located in local store 810.

Region 850 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 855 is a mapping region for the operating system and is pinned system memory with bandwidth and latency guarantees. Region 860 is a mapping region for input output devices that are external to device 800 and are defined by system and input output architectures.

Synergistic processing complex (SPC) 802 includes synergistic processing unit (SPU) 805, local store 810, and memory management unit (MMU) 815. Processing unit 830 manages SPU 805 and processes data in response to processing unit 830's direction. For example SPU 805 may be a digital signaling processing core, a microprocessor core, a micro controller core, or a combination of these cores. Local store 810 is a storage area that SPU 805 configures for a private storage area and a non-private storage area. For example, if SPU 805 requires a substantial amount of local memory, SPU 805 may allocate 100% of local store 810 to private memory. In another example, if SPU 805 requires a minimal amount of local memory, SPU 805 may allocate 10% of local store 810 to private memory and allocate the remaining 90% of local store 810 to non-private memory (see FIG. 8B and corresponding text for further details regarding local store configuration).

The portions of local store 810 that are allocated to non-private memory are managed by system memory map 820 in region 845. These non-private memory regions may be accessed by other SPU's or by processing unit 830. MMU 815 includes a direct memory access (DMA) function and passes information from local store 810 to other memory locations within device 800.

Figure 8B:
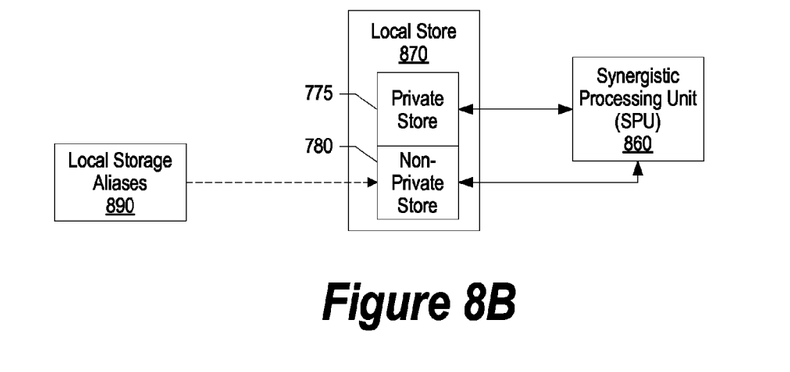
FIG. 8B is a diagram showing a local storage area divided into private memory and non-private memory.

FIG. 8B is a diagram showing a local storage area divided into private memory and non-private memory. During system boot, synergistic processing unit (SPU) 860 partitions local store 870 into two regions which are private store 875 and non-private store 880. SPU 860 is similar to SPU 805 and local store 870 is similar to local store 810 that are shown in FIG. 8A. Private store 875 is accessible by SPU 860 whereas non-private store 880 is accessible by SPU 860 as well as other processing units within a particular device. SPU 860 uses private store 875 for fast access to data. For example, SPU 860 may be responsible for complex computations that require SPU 860 to quickly access extensive amounts of data that is stored in memory. In this example, SPU 860 may allocate 100% of local store 870 to private store 875 in order to ensure that SPU 860 has enough local memory to access. In another example, SPU 860 may not require a large amount of local memory and therefore, may allocate 10% of local store 870 to private store 875 and allocate the remaining 90% of local store 870 to non-private store 880.

A system memory mapping region, such as local storage aliases 890, manages portions of local store 870 that are allocated to non-private storage. Local storage aliases 890 is similar to local storage aliases 845 that is shown in FIG. 8A. Local storage aliases 890 manages non-private storage for each SPU and allows other SPU's to access the non-private storage as well as a device's control processing unit.

While the computer system described in FIGS. 7, 8A, and 8B are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving, at a processor, an impending plug-in identifier that corresponds to a plug-in;
   determining that the plug-in is not loaded in a local memory area;
   retrieving the plug-in from a main memory area in response to the determination;
   storing the plug-in in the local memory area;
   identifying a location offset that corresponds to the storing location of the plug-in;
   saving the location offset in an entry point table;
   receiving a data stream that corresponds to the plug-in at the processor;
   retrieving the location offset from the entry point table;
   retrieving the plug-in using the retrieved location offset; and
   processing data that is included in the data stream using the retrieved plug-in.

2. The method of claim 1 further comprising:
   incrementing a usage count in an entry point table that corresponds to the plug-in.

3. The method of claim 2 further comprising:
   retrieving one or more preferences;
   determining whether to remove the plug-in from the local memory area based upon the usage count and one or more of the preferences; and
   removing the plug-in from the local memory area in response to the determination.

4. The method of claim 1 wherein the data stream includes one or more fields, and wherein at least one of the fields are selected from the group consisting of a plug-in identifier, an effective address, a plug-in size, and the data.

5. The method as described in claim 1 wherein the data stream is sent from a main processor, and wherein the processor and the main processor are heterogeneous.

6. A program product comprising:
   non-transitory computer operable medium having computer program code, the computer program code being effective to:
   receive, at a processor, an impending plug-in identifier that corresponds to a plug-in;
   determine that the plug-in is not loaded in a local memory area;
   retrieve the plug-in from a main memory area in response to the determination;
   store the plug-in in the local memory area;
   identify a location offset that corresponds to the storing location of the plug-in;
   save the location offset in an entry point table;
   receive a data stream that corresponds to the plug-in at the processor;
   retrieve the location offset from the entry point table;
   retrieve the plug-in using the retrieved location offset; and
   processing data that is included in the data stream using the retrieved plug-in.

7. The program product of claim 6 wherein the computer program code is further effective to:
   increment a usage count in an entry point table that corresponds to the plug-in.

8. The program product of claim 7 wherein the computer program code is further effective to:
   retrieve one or more preferences;

determine whether to remove the plug-in from the local storage area based upon the usage count and one or more of the preferences; and remove the plug-in from the local memory area in response to the determination.

9. The program product of claim 6 wherein the data stream includes one or more fields, and wherein at least one of the fields are selected from the group consisting of a plug-in identifier, an effective address, a plug-in size, and the data.

10. The program product as described in claim 6 wherein the data stream is sent from a main processor, and wherein the processor and the main processor are heterogeneous.

11. An information handling system comprising:
   a display;
   one or more processors;
   a local memory area;
   a main memory area accessible by one or more of the processors; and
   a plug-in management tool for managing plug-ins, the plug-in management tool comprising software code effective to:
      receive, at one of the processors, an impending plug-in identifier that corresponds to a plug-in;
      determine that the plug-in is not loaded in the local memory area;
      retrieve the plug-in from the main memory area in response to the determination;
      store the plug-in in the local memory area;
      identify a location offset that corresponds to the storing location of the plug-in;
      save the location offset in an entry point table;
      receive a data stream that corresponds to the plug-in at one of the processors;
      retrieve the location offset from the entry point table;
      retrieve the plug-in from the local memory using the retrieved location offset; and
      processing data that is included in the data stream using the retrieved plug-in.

12. The information handling system of claim 11 wherein the software code is further effective to:
   increment a usage count in an entry point table located in the local memory area that corresponds to the plug-in.

13. The information handling system of claim 12 wherein the software code is further effective to:
   retrieve one or more preferences from the main memory area;
   determine whether to remove the plug-in from the local memory area based upon the usage count and one or more of the preferences; and
   remove the plug-in from the local memory area in response to the determination.

14. The information handling system of claim 11 wherein the data stream includes one or more fields, and wherein at least one of the fields are selected from the group consisting of a plug-in identifier, an effective address, a plug-in size, and the data.

15. An information handling system comprising:
   a display;
   one or more processors;
   a local memory area;
   a main memory area accessible by one or more of the processors;
   means for receiving, at one of the processors, an impending plug-in identifier that corresponds to a plug-in;
   means for determining that the plug-in is not loaded in the local memory area;
   means for retrieving the plug-in from the main memory area in response to the determination;
   means for storing the plug-in in the local memory area;
   means for identifying a location offset that corresponds to the storing location of the plug-in;
   means for saving the location offset in an entry point table;
   means for receiving a data stream that corresponds to the plug-in at one of the processors;
   means for retrieving the location offset from the entry point table;
   means for retrieving the plug-in from the local memory using the retrieved location offset; and
   means for processing data that is included in the data stream using the retrieved plug-in.

* * * * *